March 20, 1962  M. A. CHAVANNES  3,026,231
METHOD OF MAKING AN EMBOSSED LAMINATED STRUCTURE
Filed Dec. 23, 1957
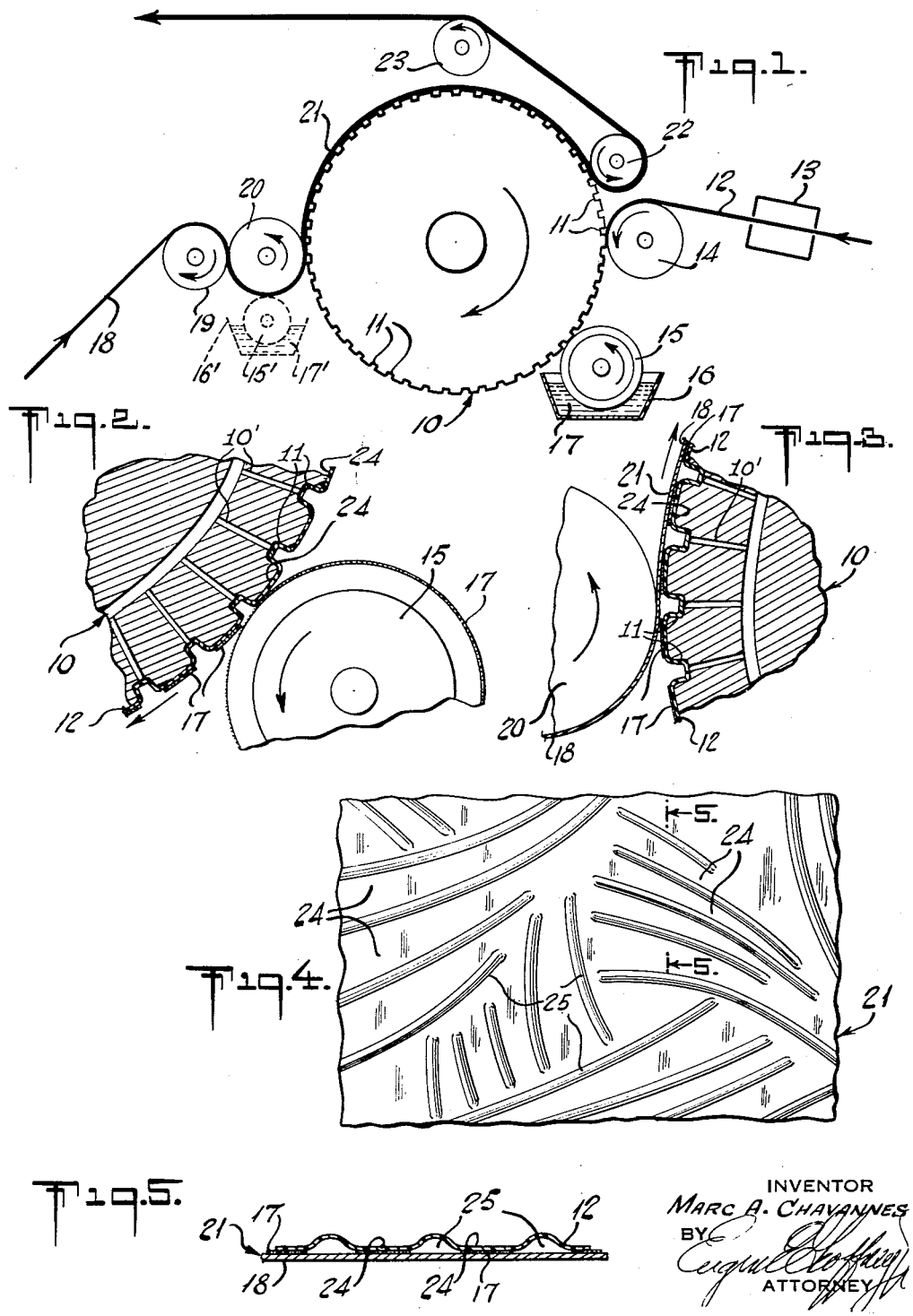
INVENTOR
MARC A. CHAVANNES
BY
ATTORNEY

United States Patent Office 3,026,231
Patented Mar. 20, 1962

3,026,231
METHOD OF MAKING AN EMBOSSED
LAMINATED STRUCTURE
Marc A. Chavannes, Brooklyn, N.Y., assignor to Sealed Air Corporation, Hawthorne, N.J.
Filed Dec. 23, 1957, Ser. No. 704,833
4 Claims. (Cl. 156—205)

This invention relates to laminated materials and more specifically to an improved embossed laminated material useful, among other things, as a wall covering, and to the manufacture thereof.

Plastics and other materials when used for covering walls and other surfaces must have sufficient thickness to afford the mechanical strength required to permit normal handling. For smooth coverings relatively thin materials can be used, while embossed coverings require relatively heavy materials so that the weight of the covering, when applying it to a wall for instance, will not distort the design embossed therein. Because of the need for relatively heavy materials in the fabrication of embossed coverings, and particularly plastic coverings, fine detail is not readily obtainable and the cost of the coverings is high and the installation is often difficult, particularly when uneven or small irregular wall sections are encountered. Furthermore, known embossed plastic coverings are necessarily stiff and brittle in order to afford the necessary self-supporting quality and consequently are readily subject to damage both in shipment and when in place on a wall or other surface.

This invention contemplates an improved embossed wall covering that overcomes the difficulties and disadvantages of prior coverings, is easier and more economical to manufacture and is easily applied to surfaces such as walls and the like.

Another object of the invention resides in a novel and improved embossed plastic covering for walls, furniture and the like, that is flexible and light in weight and will retain its configuration even when placed under substantial stress.

Still another object of the invention resides in the provision of a novel and improved laminated and embossed plastic covering material that is soft, pliable and durable.

A further object of the invention resides in a novel and improved covering material.

A still further object of the invention is a novel and improved method and apparatus for making embossed material for covering surfaces such as walls and the like.

The above and other objects and advantages of the invention will become more apparent from the following description and accompanying drawings forming part of the application.

In the drawings:

FIG. 1 is a diagrammatic view of apparatus for making laminated and embossed materials in accordance with the invention;

FIG. 2 is an enlarged view of a fragmentary section of FIG. 1;

FIG. 3 is an enlarged fragmentary section of FIG. 1;

FIG. 4 is a plan view of a laminated material in accordance with the invention; and FIG. 5 is a cross sectional view of FIG. 4 taken along the line 5—5 thereof.

As pointed out above this invention relates to the method and apparatus for the fabrication of embossed laminated materials as well as to the apparatus for the manufacture thereof and to the material itself. The material is accordance with the invention is particularly useful as a wall covering or decoration and affords an inexpensive, durable covering that is easily installed and provides a highly attractive covering having a soft, resilient surface. Because of the characteristics of the embossed material in accordance with the invention, it is particularly suited for covering furniture and adds materially to both the comfort and durability thereof. Through the utilization of this improved laminated construction a fairly thin plastic material may be employed as the surface layer. This material, upon being embossed, is cemented to a backing material that is preferably impervious to air. The application of this impervious layer seals air in the embossed portions of the surface fabric and provides support for the embossed portions. While the impervious backing layer is normally thicker than the embossed layer for wall covering purposes, the composite structure is light in weight, is easy to handle, can be rolled for storage and shipment and is easily shaped to fit any surface contour. In the case of an upholstering material the thickness and stiffness of the backing layer may be selected to obtain any desired stiffness and strength. Moreover, since the surface layer is resilient and of fairly thin section, it affords a durable surface covering that is not easily damaged. While any suitable materials may be employed for the embossed layer, it has been found that a vinyl plastic is tough, durable and can be embossed to provide exceedingly fine detail in the reproduced designs.

FIGS. 1 to 3, inclusive, illustrate one method and apparatus for making the improved laminated and embossed wall covering in accordance with the invention. In these figures the numeral 10 denotes an embossing roller of the vacuum type wherein the surface of the roller includes a plurality of depressions 11 into which the plastic material 12 to be embossed is drawn by the withdrawal of air through suitable openings 10′ extending from an inner chamber to the surface of the roller. The structure of a vacuum roller is well known in the art and a detailed description of its construction and operation is not deemed necessary. The roller or drum 10 may be driven in any suitable manner and is preferably maintained at or about room temperature.

The plastic 12 to be embossed is usually in the form of a continuous sheet and is heated by an oven diagrammatically illustrated at 13. The heated sheet is fed over a roller 14 spaced from the drum 10 a distance roughly equal to the thickness of the sheet or film 12. The moment the sheet 12 meets the surface of the roller 10 the vacuum applied to the roller sucks the film into the depressions 11 which may have any desired form or configuration. These depressions 11 are illustrated in the drawing as uniform depressions for purposes of simplicity only. As the drum 10 rotates in a clockwise direction as illustrated, the film 12 is held in the depressions in the drum and passes an adhesive applying roller 15. The bottom portion of the roller 15 extends into a container 16 having a supply of adhesive 17 therein. The adhesive is picked up on the surface of the roller and deposited on the outside of the film 12 while on the drum. Since portions of the film are drawn into the depressions 11, and since the roller is in effect the equivalent of a female die portion, adhesive will be deposited only on the so-called valleys of the embossed film.

After applying the adhesive to the film 12, an air impervious backing material 18 of plastic, paper or other suitable sheet material is applied by means of a pair of rollers 19 and 20. The rollers 19 and 20 are spaced one from the other approximately the thickness of the backing material 18 and a similar space is provided between the roller 20 and the drum 10. It is preferable, however, to provide at least slight pressure between the roller 20 and the drum 10 so that as the backing material engages the coated film 12 it will be pressed into position and firmly adhere to the film 12. The completed laminated structure denoted by the numeral 21 then proceeds about the remainder of the drum 10 and is removed by feeding it over rollers 22 and 23.

The particular adhesive 17 for use in effecting the lamination depends on the nature of the film 12 and the backing material 18. While any type of materials may be used for this purpose, the film 12 is preferably of plastic and a sufficient quantity of the plasticizer should remain in the film so that the final structure will be pliable and yet retain the embossing. The backing material is preferably a treated or coated paper of greater thickness and rigidity than the film 12 through it is apparent that other types of materials will serve equally well and the thickness and characteristics of the layers should be coordinated to provide a workable, self-supporting structure. In some cases it may be desirable to use a conventional paper to afford mechanical support for the thin film in order to prevent the embossing from being distorted during the installation of the fabric. In this case, the attachment of the fabric to the surface by a suitable cement will function to seal air in the embossed portions and produce an effect similar to that obtained with the use of an impervious sheet material 18.

A laminated embossed material in accordance with the invention is illustrated in FIGS. 4 and 5. The material is generally denoted by the numeral 21 and the valleys in the embossed surface are denoted by the numeral 24. The cross sectional view of the fabric is shown in FIG. 5 and it will be observed that only the valleys 24 are cemented to the backing material 18, leaving a plurality of air pockets 25 disposed between the valleys 24.

While it is preferable in carrying out this invention to utilize an embossing roller or drum 10 of the vacuum type, it is possible to use this improved method and to fabricate the material in accordance with the invention through the use of other embossing means. For instance, embossing can be accomplished by the utilization of male and female die parts and the backing material can be secured to the embossed material as it emerges from between the pressure rollers and before being withdrawn from the female die roller.

In the embodiment of the invention described above, adhesive was applied to the film 12 directly. If desired the adhesive may be applied to the backing material by means of a roller 15′, the adhesive 17′ being held in a container 16′. In certain instances it may be desirable to apply a heat or pressure responsive adhesive to the backing in a separate operation and then apply the prepared backing to the embossed plastic film.

As pointed out previously, the material in accordance with the invention is useful generally as a covering material and affords advantages in wall and furniture coverings not heretofore attainable. With furniture coverings, for instance, the entrapment of air between the impervious embossed and backing layers provides a soft, resilient and comfortable seating surface that may be provided with finely embossed designs closely resembling fabrics and other materials. In addition, vinyl plastics which are tough and wear resistant can be used in accordance with this invention to provide a soft and highly durable surface.

While only one embodiment of the invention has been illustrated and described, it is apparent that modifications, alterations and changes may be made without departing from the true scope and spirit of the invention.

What is claimed is:

1. The method of making an embossed laminated structure comprising the steps of heating successive portions of an elongated sheet of thermoplastic material to an embossing temperature, guiding said material onto the surface of an embossing roller having a plurality of pockets formed therein, withdrawing air from said pockets to emboss said material, while said material is in contact with said roller applying a layer of cement to the salient portions of said embossing sheet, applying a second sheet of air impervious material in overlying relationship to the first said sheet, applying pressure to said sheets to permanently join them one to the other and seal said embossed portions to form a plurality of sealed air cells extending from one surface of the composite structure and then stripping said composite structure from said embossing roller.

2. The method of making an embossed laminated structure comprising the steps of heating successive portions of a first elongated sheet of embossable material to an embossing temperature, guiding said material onto the surface of an embossing roller having a plurality of discrete pockets therein, withdrawing air from said pockets to emboss said material, moving a second sheet of material into overlying relationship with the embossed portions of the first sheet with at least one of the meeting surfaces of said sheets being coated with an adhesive and then applying pressure to said sheet when in overlying relationship on said roller to provide a unitary structure with said embossed portions being sealed to form a plurality of sealed air cells extending from at least one surface of the composite structure and then stripping said composite structure from said embossing roller.

3. The method of making an embossed laminated structure comprising the steps of heating successive portions of an elongated sheet of thermoplastic material to an embossing temperature, guiding the heated material onto the surface of an embossing roller having a plurality of discrete pockets formed therein, withdrawing air from said pockets to emboss said material, while said material is in contact with said roller feeding a second sheet of air impervious material into overlying relationship with the first said sheet with the meeting surfaces of at least one of said sheets being treated with an adhesive to adhere to the meeting surface of the other sheet, and then pressing said sheets one against the other to seal said embossed portions and form a plurality of sealed air cells and then stripping said composite structure from said embossing roller.

4. The method of making an embossed laminated structure comprising the steps of heating successive portions of an elongated sheet of plastic material to an embossing temperature, guiding said material onto the surface of an embossing roller having a plurality of pockets formed therein, withdrawing air from said pockets to emboss said material, preparing a second sheet of air impervious material for movement into overlying relationship with the first said sheet, applying a pressure and heat responsive adhesive to at least one of the facing surfaces of said sheets, then feeding said second sheet into said overlying relationship with said heat and pressure responsive material therebetween to permanently join them one to the other and seal said embossed portions to form a plurality of sealed air cells extending from at least one surface of the composite structure and then stripping said composite structure from said embossing roller.

References Cited in the file of this patent

UNITED STATES PATENTS

| 2,429,482 | Munters | Oct. 21, 1947 |
| 2,480,316 | Blair et al. | Aug. 30, 1949 |
| 2,497,212 | Donofrio | Feb. 14, 1950 |
| 2,503,164 | McGuire | Apr. 4, 1950 |
| 2,633,442 | Caldwell | Mar. 31, 1953 |
| 2,660,757 | Smith | Dec. 1, 1953 |
| 2,670,501 | Michiels | Mar. 2, 1954 |
| 2,856,323 | Gordon | Oct. 14, 1958 |
| 2,902,718 | Martelli et al. | Sept. 8, 1959 |

FOREIGN PATENTS

| 565,370 | Great Britain | Nov. 8, 1944 |
| 160,551 | Australia | Jan. 13, 1955 |